Nov. 25, 1924.
E. HEYDON
1,517,157
TROLLEY WIRE HANGER
Filed April 3, 1924
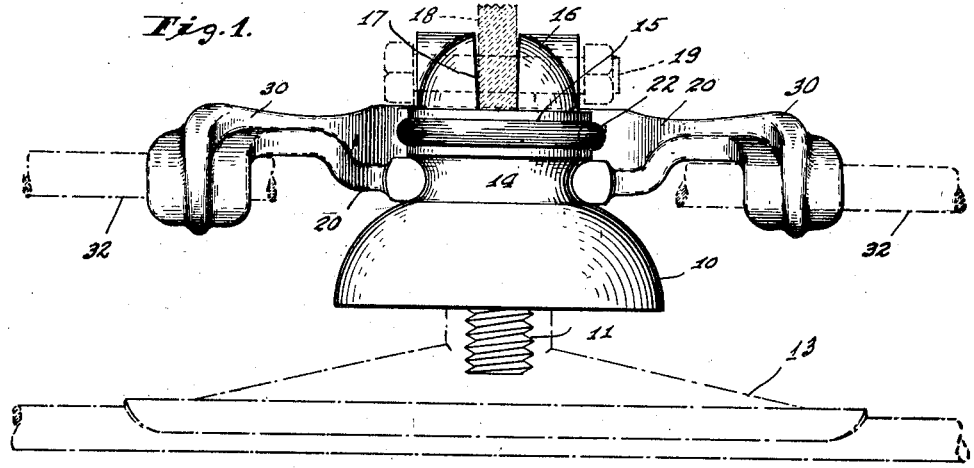
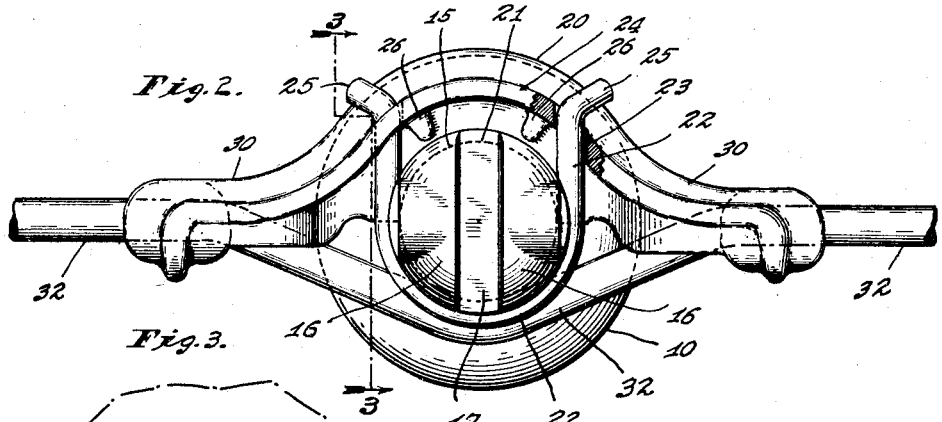
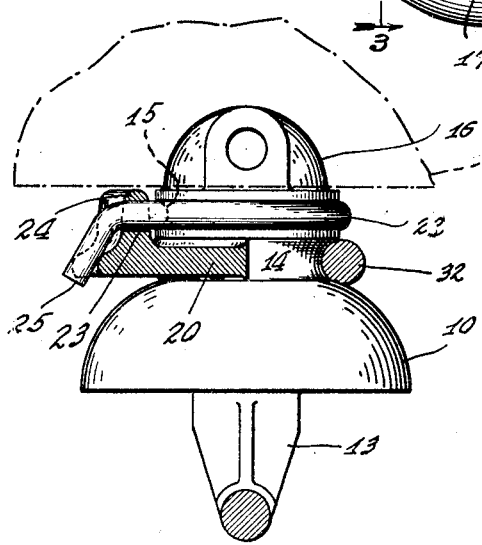
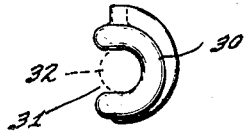
INVENTOR.
EDWARD HEYDON, DECEASED,
BY EMMA HEYDON, EXECUTRIX,
BY
ATTORNEY.

Patented Nov. 25, 1924.                                    1,517,157

UNITED STATES PATENT OFFICE.

EDWARD HEYDON, DECEASED, LATE OF INDIANAPOLIS, INDIANA; BY EMMA HEYDON, EXECUTRIX, OF INDIANAPOLIS, INDIANA.

TROLLEY-WIRE HANGER.

Application filed April 3, 1924. Serial No. 704,005.

*To all whom it may concern:*

Be it known that EDWARD HEYDON, deceased, who before his death was a citizen of the United States, residing at Indianapolis, in the county of Marion and State of Indiana, invented a new and useful Trolley-Wire Hanger, of which the following is a specification.

It is the object of the invention to produce a trolley-wire hanger which has a body part rotatably mounted and readily adjustable in a yoke and readily attachable to and detachable from the yoke, and which holds the body in place in the yoke by interlocking parts as well as by the action of the supporting cross-wire so that the body and yoke will be held together even though the cross-wire breaks; and in which such holding means includes a simple clamp separate from the yoke, so that it may be made of drawn or other tough metal which is less likely to break on bending than is the cast metal of the yoke and so that if it does break another clamp may be substituted inexpensively without requiring an entire new yoke.

The present invention is an improvement on and development of the trolley-wire hanger shown in the inventor's prior Patent No. 1,375,152, granted April 19, 1921. The hanger shown in such prior patent has proved most effective and serviceable in use, and has gone into extensive use. In the hanger of such prior patent, however, the holding means which held the yoke and the body together independently of the cross-wire included certain bendable fingers on the yoke, for gripping the body; and as these bendable fingers were of cast metal, as part of the yoke casting, it sometimes happened that they broke off, especially when a yoke and a body had been attached together and detached a plurality of times, involving several opposite bendings of the fingers.

The accompanying drawing illustrates the invention: Fig. 1 is a side elevation of the improved trolley-wire hanger; Fig. 2 is a plan of such hanger; Fig. 3 is an end elevation of such trolley-wire hanger, in partial section on the line 3—3 of Fig. 2; and Fig. 4 is an elevation of the end of the yoke.

The hanger body 10 has suitably mounted in it a screw stud 11, which is insulated from the hanger body in any suitable manner; such for instance as the manner indicated in the aforesaid prior patent, so that it is unnecessary to illustrate such insulation again here. Any suitable trolley ear 13 is mounted on the screw stud 11.

The hanger body 10 is in general bell-shaped, but is provided near the top with two circumferential grooves 14 and 15, by which it is supported. These two grooves 14 and 15 extend completely around the hanger body 10, one above the other. On the top, above the grooves 14 and 15, the body 10 is provided with lugs 16, of which only two are shown in this case though that number is not essential. These lugs provide one or more cross-slots 17, one as shown. The cross-slot 17 may receive any suitable tool for turning the body in its support. Also, in places where it is necessary or desirable, the cross-slot 17 may receive a supporting hanger 18, of any suitable character, which may be fastened in place between the lugs 16 by a cross-bolt 19 extending through the lugs 16 perpendicularly to the cross-slot 17.

The body 10 is normally supported, however, in a yoke 20, which is provided at its middle with a laterally opening recess 21 by which it fits in the groove 14 of the body 10. The opening 21 is arc-shaped, of proper size to permit the lateral insertion of the hanger body 10 at the groove 14; and preferably is semi-circular or nearly so.

In the hanger of the aforesaid prior patent, the body 10 is held in place in this arc-shaped recess 21 by certain bendable fingers which are provided on the yoke and also cooperate with the groove 14. Difficulty has occasionally been encountered by the breaking of these fingers, which breaking made the entire yoke useless. According to the present invention, such bendable fingers on the yoke are eliminated. Instead there is a clamp 22 which is U-shaped and interfits with the groove 15, which latter groove was not provided in the structure of said prior patent. This clamp 22 is conveniently made of wire, which because it is drawn metal will permit considerable bending back and forth without breaking —much more bending than is possible with cast metal. Even if the clamp 22 breaks, that does not render the yoke 20 useless, and a new clamp 22 may be substituted at small expense. The liability of breaking the clamp 22, however, is much less than is that of the cast-metal bendable fingers of said prior patent, as the yoke is usually made as a casting.

The curved base of the clamp 22 and of the yoke 10 at the recess 21 are on opposite sides of the body 10, to grip the body between them. The arms of the clamp 22 project beyond its curved base, and through holes 23 in a strengthening rib 24 of the yoke 20, and the ends 25 of such clamp-arms are bent, conveniently downward and slightly apart, to lock the clamp 22 to the yoke 20 with the body 10 between them. The ends 25 may be straightened out whenever it is desired to separate the yoke from the body, and ordinarily may be rebent and re-straightened a number of times without breaking, for attaching and separating the body and yoke, though in most instances it is not necessary to do this repeatedly. If desired, the strengthening rib 24 of the yoke may have inwardly projecting lugs 26, of which two are shown, for projecting inward toward or to the body 10 in the plane of that portion of the body which contains the groove 15. These lugs 26, however, are not essential, and may be omitted if desired.

The yoke 20 also has two oppositely projecting arms 30, each of which is provided at its end with a horizontal slot 31 opening toward the opposite side of the yoke from that toward which the recess 21 opens. These slots 31 receive the supporting cross-wire 32, which is under tension in the usual manner and which between the projecting arms 30 lies in the groove 14 of the body 10 on the opposite side thereof from the yoke. In other words, the cross-wire 32 passes around the body 10 on the opposite side thereof from that toward which the slots 31 open, and on the same side which receives the base of the clamp 22. In consequence, the tension of the cross-wire 32 forces the body 10 into the opening 21, and holds such cross-wire firmly in the slots 31. Yet during installation, and also if the cross-wire breaks, the clamp 22 holds the body 10 and yoke 20 together. In addition, the tension of the cross-wire 32 effectively locks the body 10 against accidental turning in the yoke 20, thus preventing the screw stud 11 from working loose from the trolley ear 13. Yet when desired, the body 10 may be turned in the yoke 20, by a suitable tool inserted in the slot 17, to permit the angular relationship between the yoke 20 and the trolley wire in the ear 13 to be adjusted if desired.

The body and the yoke may be attached together by the clamp 22 either in the shop or by the lineman when he is installing the hanger; and if it is necessary for any reason to separate them, this can be done readily by straightening the ends 25 of the clamp 22. The bending and straightening of such ends 25 may be done in any suitable manner, as by a hammer, or by some special bending tool.

The invention claimed is:

1. A trolley-wire hanger, comprising a body having two circumferential grooves, a a yoke having a laterally opening recess arranged to receive the body by interfitting with one of said grooves, and a clamp which interfits with the other of said grooves and is attachable to said yoke.

2. A trolley-wire hanger, comprising a body having a circumferential groove, a yoke having a laterally opening recess arranged to receive the body by interfitting with said groove, and a separate clamp which co-operates with said body and said yoke to clamp said body and yoke together.

3. A trolley-wire hanger, comprising a body having a circumferential groove, a yoke having a laterally opening recess arranged to receive the body by interfitting with said groove and a clamp having a laterally opening recess which interfits with said body on the other side thereof from the interfitting with said yoke part, said clamp and said yoke being arranged to be attached together to clamp the body between them.

4. A trolley-wire hanger, comprising a body having a circumferential groove, a yoke having a laterally opening recess arranged to receive the body by interfitting with said groove, and a U-shaped clamp which interfits with said body on the other side of the latter from said first interfitting and has its arms arranged to interlock with said yoke.

5. A trolley-wire hanger, comprising a body having a circumferential groove, a yoke having a laterally opening recess arranged to receive the body by interfitting with said groove, and a U-shaped clamp which interfits with said body on the other side of the latter from said first interfitting said yoke being provided with holes through which the ends of the arms of said U-shaped clamp may extend, so that by bending said arm-ends the clamp and yoke may be locked together.

6. The combination set forth in claim 1, with the addition that said yoke has two oppositely projecting arms for engaging the cross-wire, the opening of said recess being transverse to the line of said engaging arms so that a cross-wire passing between them may pass around the body on the open side of said recess.

7. The combination set forth in claim 2, with the addition that said yoke has two oppositely projecting arms for engaging the cross-wire, the opening of said recess being transverse to the line of said engaging arms so that a cross-wire passing between them may pass around the body on the open side of said recess.

8. The combination set forth in claim 3, with the addition that said yoke has two oppositely projecting arms for engaging the cross-wire, the opening of said recess being transverse to the line of said engaging arms so that a cross-wire passing between them may pass around the body on the open side of said recess.

9. The combination set forth in claim 4, with the addition that said yoke has two oppositely projecting arms for engaging the cross-wire, the opening of said recess being transverse to the line of said engaging arms so that a cross-wire passing between them may pass around the body on the open side of said recess.

10. The combination set forth in claim 5, with the addition that said yoke has two oppositely projecting arms for engaging the cross-wire, the opening of said recess being transverse to the line of said engaging arms so that a cross-wire passing between them may pass around the body on the open side of said recess.

In witness whereof, I have hereunto set my hand at Indianapolis, Indiana, this 31st day of March, 1924.

EMMA HEYDON,
*Executrix of the Estate of Edward Heydon, deceased.*